United States Patent [19]

Callen et al.

[11] Patent Number: 5,622,597

[45] Date of Patent: Apr. 22, 1997

[54] PROCESS FOR DEINKING OF RECYCLED PAPER

[75] Inventors: John W. Callen; Alicia Anderson-Norris, both of Cataula, Ga.

[73] Assignee: Callaway Corporation, Columbus, Ga.

[21] Appl. No.: 377,144

[22] Filed: Jan. 24, 1995

[51] Int. Cl.$^6$ .................................................. D21C 5/02
[52] U.S. Cl. .................. 162/5; 162/25; 162/26; 162/76
[58] Field of Search .................. 162/1, 4, 5, 7, 162/17, 24, 25, 26, 59, 76

[56] References Cited

U.S. PATENT DOCUMENTS

| | | | |
|---|---|---|---|
| 4,451,398 | 5/1984 | Patsch et al. | 260/154 |
| 4,720,383 | 1/1988 | Drach et al. | 424/70 |
| 4,935,096 | 6/1990 | Gallagher et al. | 162/5 |
| 5,286,346 | 2/1994 | Engelskirchen et al. | 162/8 |

*Primary Examiner*—David A. Redding
*Attorney, Agent, or Firm*—Bruce F. Jacobs; Diderico VanEyl

[57] ABSTRACT

A process for deinking recycled paper using a pressurized deinking module to separate ink from paper pulp stock. The addition of salts of imidazolinium based compounds with alkyl, alkenyl and amidoethyl side chains to the pulp slurry at the beginning of the pressurized deinking module cycle removes ink more effectively and results in a brighter recycled paper and an increase in yield of final paper stock.

16 Claims, No Drawings

PROCESS FOR DEINKING OF RECYCLED PAPER

BACKGROUND OF THE INVENTION

This invention relates to a process for deinking of recycled paper to produce new, usable paper. The invention further relates to such a process using a pressurized deinking module. More particularly, the invention relates to the use of particular imidazolinium surfactants to obtain a more effective ink removal and a brighter paper stock.

Recycling of paper products such as newspapers, magazines, books, handbills and the like, has long been practiced for reasons of economy. In comparison to starting from basic cellulosic materials such as wood or rags, there are fewer steps in the recycling process, and the raw materials are less expensive. In the earlier days of recycling, it was mainly a hit or miss matter, making use of whatever materials may have been available. In more recent times, other factors have made recycling of paper more prevalent. There has been a veritable explosion of publishing of printed materials, particularly magazines and paperback books (in spite of increased television viewing). Office copiers turn out a considerable amount of waste printed matter. All of this material has created a serious disposal problem with overflowing trash dumps and consequent effects on the environment. The environmental problems have resulted in mandatory recycling legislation in many jurisdictions. Thus there is now available a much greater amount of waste paper for recycling, which is being collected outside the paper industry and is therefore more readily available to the industry for recycling. Thus the economic reasons for recycling are now even more compelling, reinforced by the environmental factors. Thus any improvement in processes for recycling waste paper are highly desirable.

Earlier processes for recycling printed waste paper included certain basic steps, namely cutting the waste paper and dispersing it in an aqueous medium containing flotation surfactants to form a paper pulp slurry, then submitting the pulp slurry to aeration and flotation to separate the ink. The aeration and flotation are carried out in the same vessel, open to the atmosphere. The pulp slurry, together with air, is fed into the vessel where the air forms bubbles to which ink particles become attached. The bubbles and ink rise to the surface as a foam. The flotation surfactants in the pulp slurry facilitate adherence of the ink particles to the air bubbles. The vessel has an overflow area on one side where the foam and some of the pulp slurry flow out of the vessel as reject material. The air originally pumped into the pulp slurry passes into the atmosphere. The major portion of the pulp slurry is withdrawn from the bottom of the vessel as acceptable recycled pulp. This pulp could then be submitted to further treatments including further contaminant and ink removal and bleaching. This system presents some problems in that the overflow of some of the pulp slurry results in loss of useful paper fiber. Moreover, the escaping air is an environmental problem since it contaminates the atmosphere. In addition, the paper made from the pulp of this process was not sufficiently bright for use in many commercial applications. In view of the importance of waste paper recycling, numerous improvements have been proposed, such as new chemicals to enhance the flotation of the ink in the deinking step of the process. However, the basic process was not changed, and the inherent problems of the open system, viz. loss of pulp, atmospheric contamination, and poor brightness, remained until quite recently.

Around 1987, a new concept in the flotation step of the waste paper recycling process was developed by the Beloit Corporation. This concept is described in detail in an article entitled "Pressurized Deinking Module", Pulp Technology and Energy, May, 1990. The new concept is to conduct the flotation step under pressure in a closed, pressurized vessel. The vessel, known as a pressurized deinking module (PDM), is used to perform the deinking flotation procedure under pressure. Briefly, the Beloit PDM consists of a roughly cylindrical, elongated vessel, closed at both ends, horizontally inclined with an inlet conduit smaller than the main cylindrical vessel at one end, and outlets at the other end for removing pulp accepts and foam rejects. A preformed pulp slurry containing flotation surfactants is pumped into the inlet conduit which forms an aeration and mixing zone, followed by the flotation zone in the main cylindrical vessel. Air is pumped into the aeration zone under pressure, and mixing of the air and pulp slurry take place. The mixing is vigorous, resulting in smaller than usual, and therefore a greater number of, air bubbles than in a conventional non-pressurized deinking system. In the flotation zone, the greater number of air bubbles increases the chance of contact with ink particles. The bubbles then rise to the surface, forming a foam of air and ink particles in a layer on top of the pulp slurry. The larger number of bubbles removes a larger amount of the ink particles, resulting in a whiter and brighter paper stock. The pulp slurry is removed from a point below the surface of the pulp slurry at the outlet end of the pressurized deinking module. The air and ink particle foam rejects are forced out of an outlet which is above the level of the pulp slurry and within the foam layer formed by the air under pressure within the vessel. The foam rejects are then fed to a cyclone separator to separate the ink particles from the air. The air can then be released to the atmosphere since it is not contaminated. Alternatively, it may be recycled to the aeration zone of the pressurized deinking module. Since the vessel is totally enclosed, all factors, such as air flow rate in and out, pulp slurry in and out, and air bubble and ink particle contact, are controllable, making for a much more effective flotation process. In addition, since no pulp slurry leaves the vessel with the ink foam, as in the open flotation process, the yield of recycled paper stock is higher. Thus, the pressurized deinking module solves the long standing problems of releasing contaminated air, and loss of pulp slurry by overflow, as well as producing a brighter paper stock.

The ideal objective of a deinking process is to obtain complete ink removal with no fiber loss. This situation has to date never been achieved by any of the above described systems.

It is therefore an object of this invention to provide a process for recycling waste paper having an improved deinking step to produce a recycled paper which has a higher degree of brightness than that previously produced.

A further object is to provide such a process which results in a higher yield of recycled fiber.

Another object is to provide such a process requiring fewer steps and reduced chemical additives.

DESCRIPTION OF THE INVENTION

The above objects can be attained and the disadvantages of the prior art can be overcome by the present invention.

In the present invention, the process for deinking recycled waste paper begins with the conventional step of cutting the waste paper being recycled and dispersing it in an aqueous medium containing deinking surfactants to form a pulp slurry. The slurry is then subjected to deinking by flotation. In the present invention a pressurized deinking module, preferably a module as manufactured by the Beloit Corporation, is used for the deinking step. The pulp slurry is pumped to the inlet of the pressurized deinking module where it enters the aeration zone. Pressurized air is also fed to this zone.

The invention consists of adding a small amount, about 10 to 50, preferably about 15 to 30, more preferably about 18 to 28, ppm of a monovalent salt of an imidazolinium compound to the pulp slurry at the inlet of the pressurized deinking module. Suitable such salts include as the counterion chloride, bromide, fluoride, methyl sulfate and the like. Preferably the imidazolinium compounds are of the following general formula:

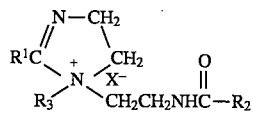

where $R^1$ and $R^2$ are alkyl or alkenyl groups containing about 10 to 22 carbon atoms, $R^3$ is an alkyl group containing about 1 to 3 carbon atoms, and X is a monovalent anion such as chloride, bromide, fluoride or methyl sulfate anion. Examples of specific such salts include: methyl-1-tallowamidoethyl-2-tallow imidazolinium methyl sulfate, methyl-1-oleylamidoethyl-2-oleyl imidazolinium methyl sulfate, methyl-1-hydrogenated tallowamidoethyl-2-hydrogenated tallow imidazolinium methyl sulfate, 1-ethylenebis(2-tallow, 1-methyl), imidazolinium methyl sulfate, methyl-1-tallowamidoethyl-2-tallow imidazolinium chloride and methyl-1-oleylamidoethyl-2-oleyl imidazolinium chloride.

The salt, which is supplied as a 50% aqueous solution, is pumped into a stream of water in a static mixer for random dilution. The diluted salt solution is then pumped into the suction side of the pump which feeds the pulp slurry containing deinking surfactants into the inlet of the pressurized deinking module.

The pulp slurry is then mixed with pressurized air in the aeration zone to form air bubbles in the slurry and further fed to the flotation zone of the pressurized deinking module, where the ink particles come into contact with the air bubbles which rise to the surface of the pulp slurry to form a foam. The foam is carried out of the outlet located above the level of the pulp slurry, and the pulp slurry is removed at an outlet below the surface of the pulp slurry. The pulp slurry may then be washed, dewatered to thicken it, or submitted to any other desired action to form a usable paper stock. The foam is preferably passed to a cyclone separator where the ink particles are separated from the air which is released to the atmosphere or returned to the aeration zone of the deinking module.

It has been found that the addition of the above-described imidazolinium compounds produces a brighter paper and a higher yield of pulp fiber accepts. A further benefit is that, due to the production of brighter paper, it is sometimes possible to reduce the amount of bleaching done after the deinking step. This reduces the requirements for both bleaching chemicals and chelants, such as diethylenetriaminepentaacetic acid (DTPA), added to complex metal ions which consume the bleaching chemicals.

The operation and benefits of the process of the present invention, as described, are explained in the following examples in which all parts and percents are by weight unless otherwise specified.

COMPARATIVE EXAMPLE A

In this example printed waste paper was submitted to a deinking process using a pressurized deinking module produced by the Beloit Corporation. The printed waste paper was first cut up and dispersed in water using a hydropulper. The deinking additives used included an ethylene oxide-propylene oxide nonionic surfactant (4 pounds per dry ton of pulp), sodium silicate (1.0–3.0% of dry pulp) and sodium hydroxide (0.8–1.5% of dry pulp to attain a pH of 9.5–10.5). The bleaching chemical was hydrogen peroxide (0.5–2.0% of dry pulp, and the chelant was DTPA (0.15–0.4% of dry pulp). The pulp slurry was pumped to the aeration zone of the pressurized deinking module where air was admitted under a pressure of about 35–40 psig. Subsequently the slurry was passed to the mixing zone where it was thoroughly mixed. The pulp slurry then passed to the deinking and flotation zone where the ink and air bubbles separated as a foam at the top of the slurry. Both the pulp slurry and the foam were then withdrawn in separate streams. Subsequent to the deinking step the pulp was bleached with 0.75–1.0% sodium hydrosulfite and 0.2–0.3% DTPA. This is the standard pressurized deinking process, and is given to establish a standard for comparison. Pulp yield was approximately 68.5% of the waste paper charged. Brightness of the pulp was measured at both the inlet and the outlet of the pressurized deinking module. The increase in brightness across the pressurized deinking module was 2.1 points as measured on a Technobrite TB-1 brightness meter produced by the Technodyne Corporation.

EXAMPLE 1

This example was conducted in the same manner and under the same conditions as Comparative Example A, except that a small amount, 18–28 ppm, methyl-1-oleylamidoethyl-2-oleyl imidazolinium methyl sulfate based on the total weight of the pulp slurry was added to the pulp slurry at the inlet of the pressurized deinking module. The salt solution, containing 50% methyl-1-oleylamidoethyl-2-oleyl imidazolinium methyl sulfate, was randomly diluted by pumping it into a stream of water in a static mixer. The diluted salt solution was then pumped into the suction side of the pump feeding the pulp slurry to the inlet of the pressurized deinking module. In a number of trials, the brightness gain across the pressurized deinking module was 3 to 7 points with an average of 4.5 points. The fiber yield during the trials averaged 72.5%, a 4% improvement over the standard. Because of the brightness gain in the deinking module when using the process of the present invention, the level of bleaching chemicals used after the deinking stage (sodium hydrosulfite and DTPA) was reduced to approximately half the level used in Comparative Example A.

EXAMPLE 2

Under the same procedure as Example 1, methyl-1-tallowamidoethyl-2-tallow imidazolinium methyl sulfate was added to the pulp slurry which was then pumped to the pressurized deinking module. The results were similar to Example 1.

COMPARATIVE EXAMPLE B

This example was conducted under the same procedure as Examples 1 and 2, except a different class of amino compound, i.e. methylbis(tallowamidoethyl)-2-hydroxyethyl ammonium methyl sulfate, was used. This amino compound was selected because it is an example of a quaternary cationic surfactant that does not contain imidazolinium functionality. No improvement in brightness increase was observed across the pressurized deinking module.

COMPARATIVE EXAMPLE C

This example was also conducted for comparative purposes, but substituting a cationic polymer prepared by reacting bis(hexamethylene)triamine with epichlorohydrin. No improvement in brightness increase across the pressurized deinking module was obtained.

The foregoing description, specific embodiments and specific examples are given for purposes of illustration of the invention, and the invention is not intended to be limited thereto. It will be understood that numerous variations and combinations can be utilized as limited only by the scope of the following claims.

What is claimed is:

1. In a flotation process for recycling inked waste paper to obtain new, usable paper, which comprises the steps of preparing a pulp slurry and thereafter deinking said pulp slurry in a pressurized deinking module, the improvement which comprises adding a cationic surfactant which is a monovalent salt of an imidazolinium compound in an effective amount, whereby the brightness of the pulp and the fiber yield are increased.

2. The process of claim 1, wherein the amount of monovalent salt of an imidazolinium compound added to the pulp slurry is from about 10 to 50 ppm based on the total weight of the pulp slurry.

3. The process of claim 2, wherein the the amount of monovalent salt of an imidazolinium compound is from about 18 to 28 ppm.

4. The process of claim 1, wherein the brightness of the deinked pulp slurry is at least about 3 points and the increased fiber yield is at least about 2%.

5. The process of claim 1, wherein said monovalent salt of an imidazolinium compound is of the following general formula:

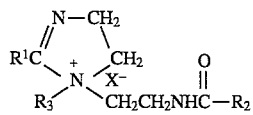

where $R^1$ and $R^2$ are alkyl or alkenyl groups containing about 10 to 22 carbon atoms, $R^3$ is an alkyl group containing 1 to 3 carbon atoms, and X is a monovalent anion.

6. The process of claim 5, wherein said monovalent anion is of the group chloride, bromide, fluoride or methyl sulfate.

7. The process of claim 5, wherein the amount of said imidazolinium salt added to the pulp slurry is from about 15 to 30 ppm based on the total weight of the pulp slurry.

8. The process of claim 5, wherein the amount of imidazolinium salt added to the pulp slurry is from about 18 to 28 ppm.

9. The process of claim 5, wherein said imidazolinium salt is methyl-1-oleylamidoethyl-2-oleyl imidazolinium methyl sulfate.

10. The process of claim 5, wherein said imidazolinium salt is methyl-1-tallowamidoethyl-2-tallow imidazolinium methyl sulfate.

11. In a flotation process for recycling inked waste paper to obtain new, usable paper, which comprises the steps of preparing a pulp slurry and thereafter deinking said pulp slurry in a pressurized deinking module, and thereafter bleaching said deinked pulp slurry, the improvement which comprises adding a cationic surfactant which is a monovalent salt of an imidazolinium compound in an effective amount, whereby a brighter deinked pulp slurry is obtained and a reduced amount of bleaching chemicals is added to the deinked pulp slurry.

12. The process of claim 11, wherein the monovalent salt of an imidazolinium compound is added to the pulp slurry in the amount of 10 to 50 ppm.

13. The process of claim 11, wherein the monovalent salt of an imidazolinium compound is of the following general formula:

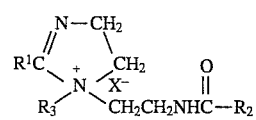

where $R^1$ and $R^2$ are alkyl or alkenyl groups containing about 10 to 22 carbon atoms, $R^3$ is an alkyl group containing about 1 to 3 carbon atoms, and X is a monovalent anion.

14. The process of claim 13, wherein said imidazolinium salt is added to the pulp slurry in an amount from 15 to 30 ppm.

15. The process of claim 13, wherein said imidazolinium salt is methyl-1-oleylamidoethyl-2-oleyl imidazolinium methyl sulfate.

16. The process of claim 13, wherein said imidazolinium salt is methyl-1-tallowamidoethyl-2-tallow imidazolinium methyl sulfate.

* * * * *